Figure 12:
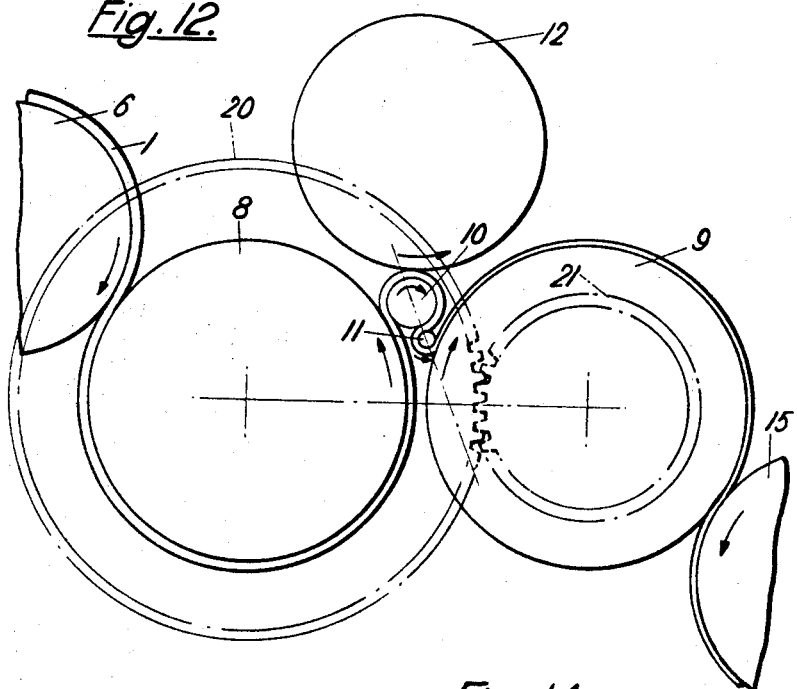

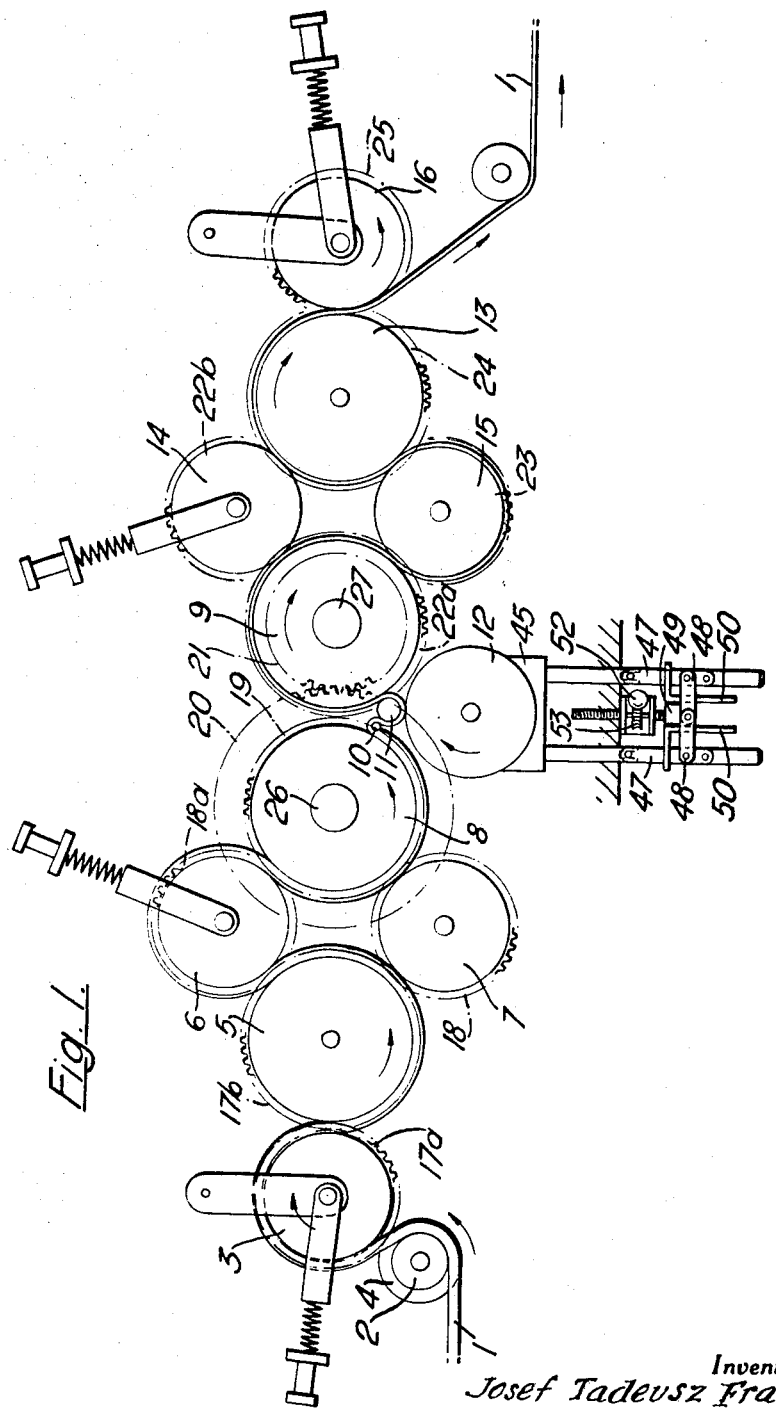

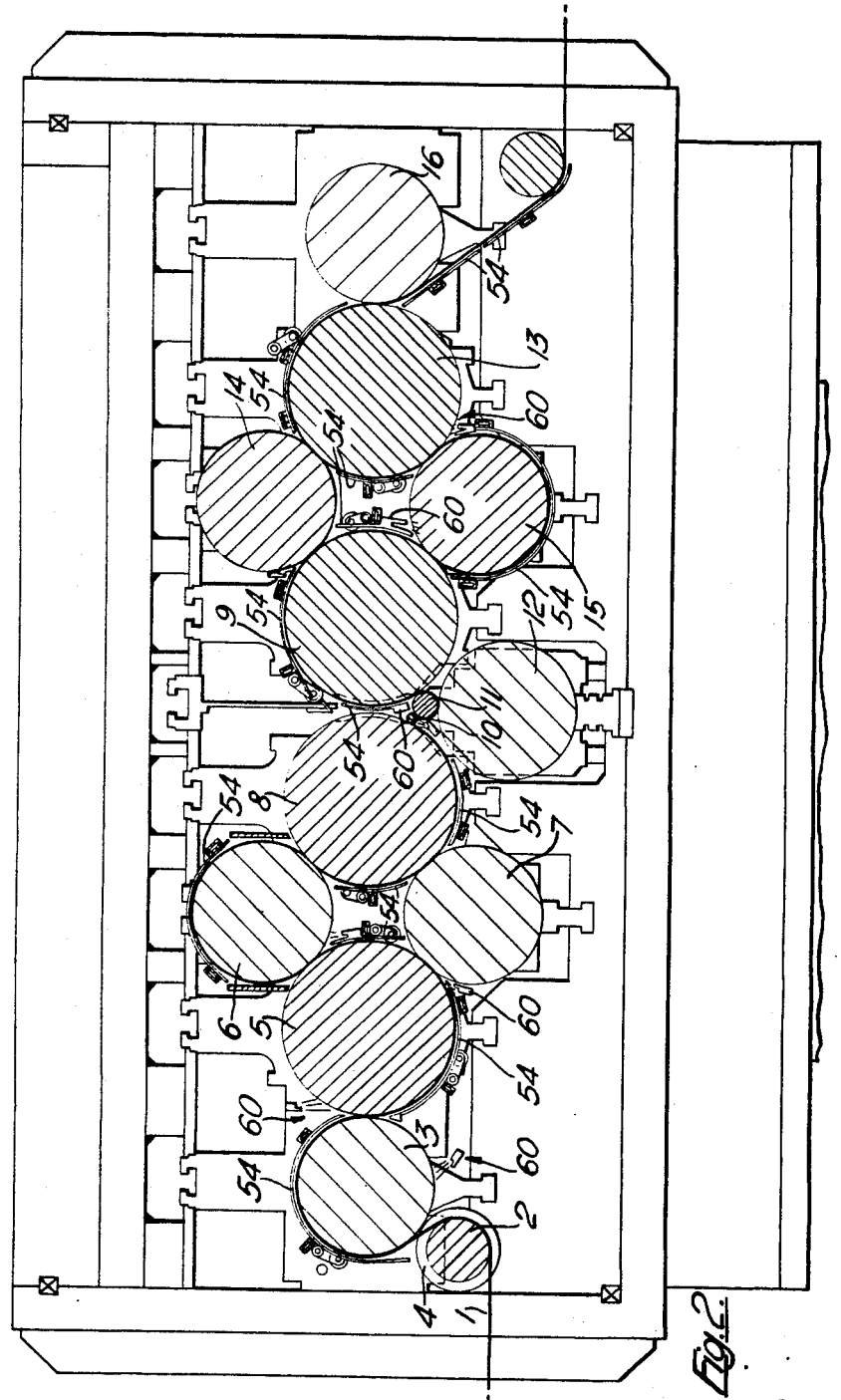

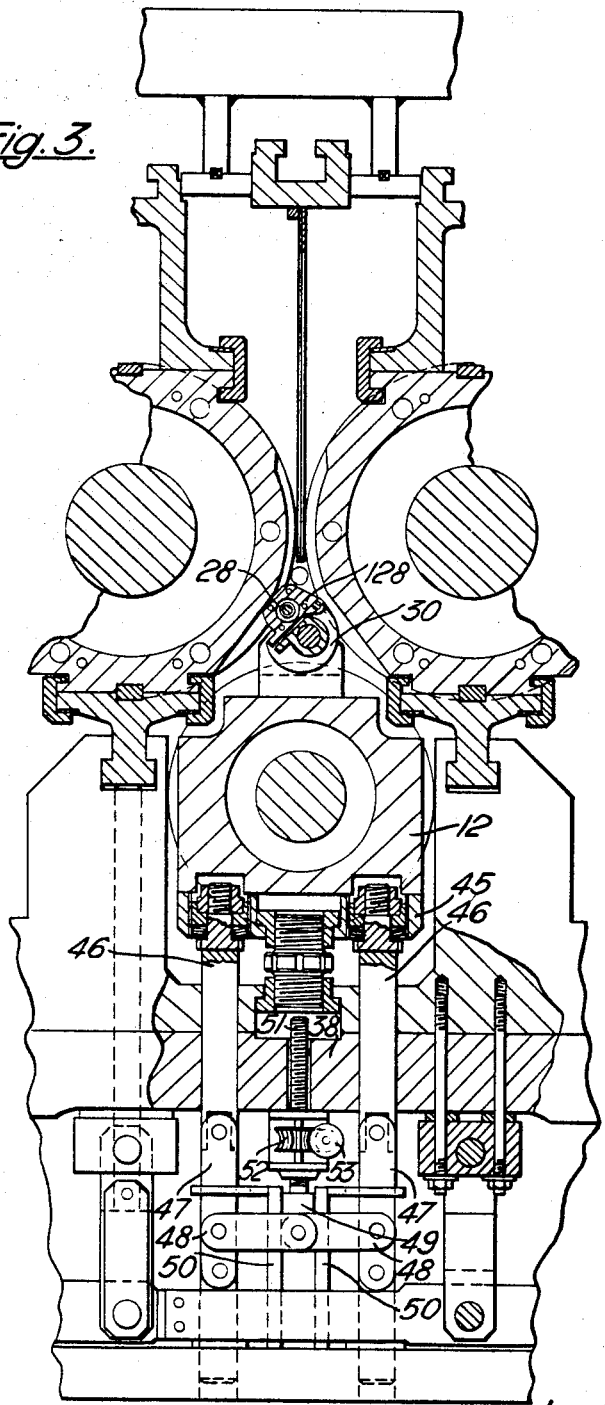

July 30, 1968
J. T. FRANEK ET AL
3,394,574
TREATMENT OF STRIP METAL
Filed March 29, 1966
8 Sheets-Sheet 4
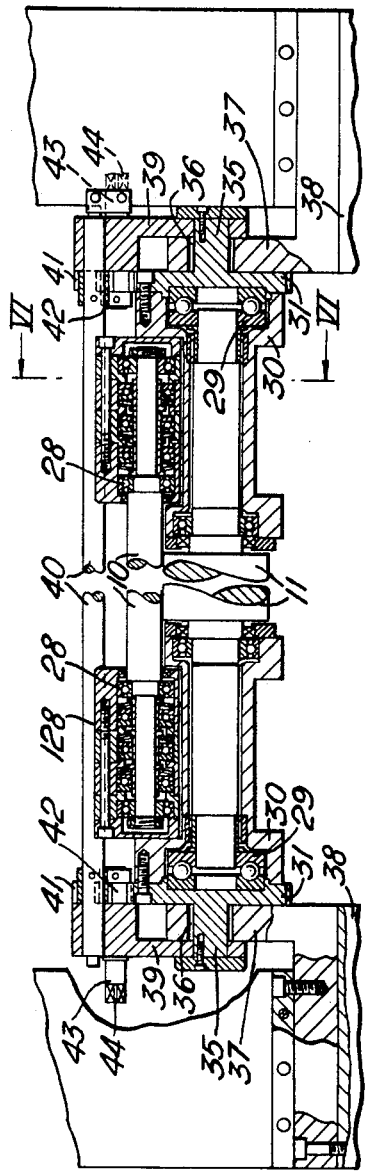
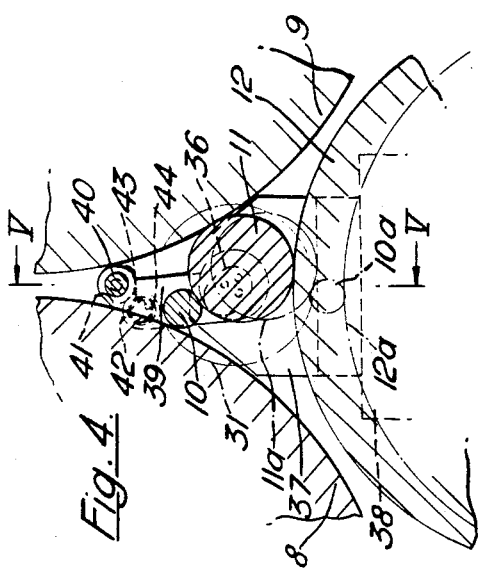
Inventors
Josef Tadeusz Franek
Brian Grinsted.
By
Mason, Porter, Diller & Brown
Attorneys July 30, 1968    J. T. FRANEK ET AL    3,394,574
TREATMENT OF STRIP METAL
Filed March 29, 1966    8 Sheets-Sheet 5
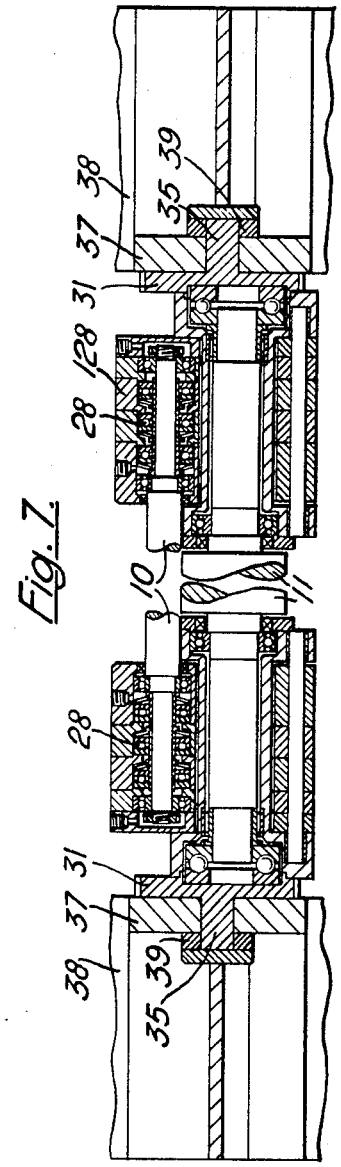
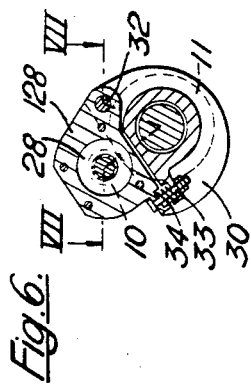
Inventors
Josef Tadeusz Franek
Brian Grinsted
By
Mason, Porter, Diller & Brown
Attorneys

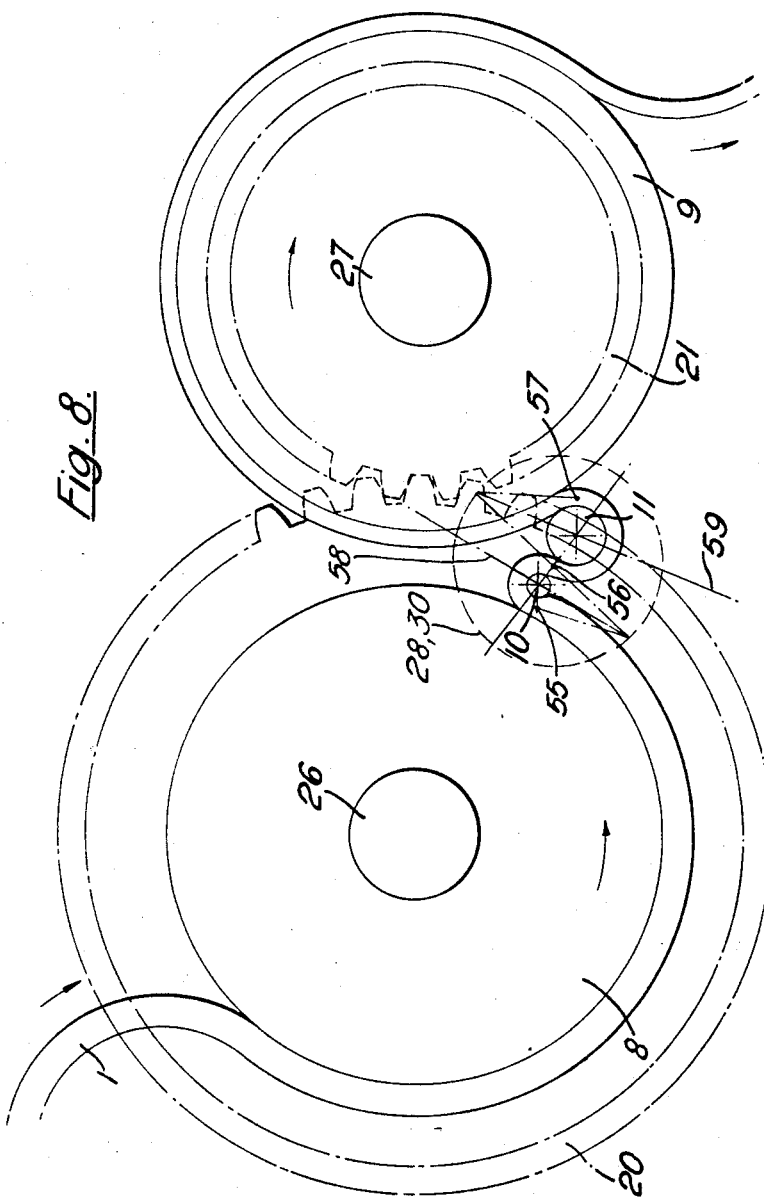

July 30, 1968   J. T. FRANEK ET AL   3,394,574
TREATMENT OF STRIP METAL
Filed March 29, 1966   8 Sheets-Sheet 7
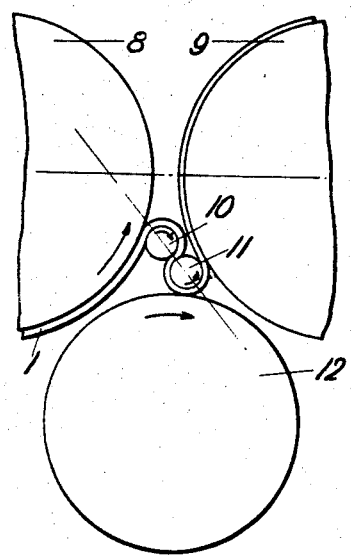
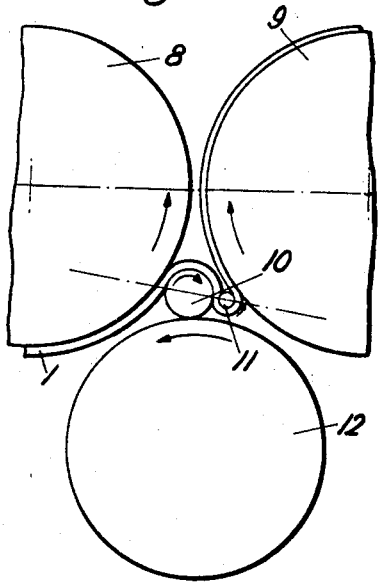
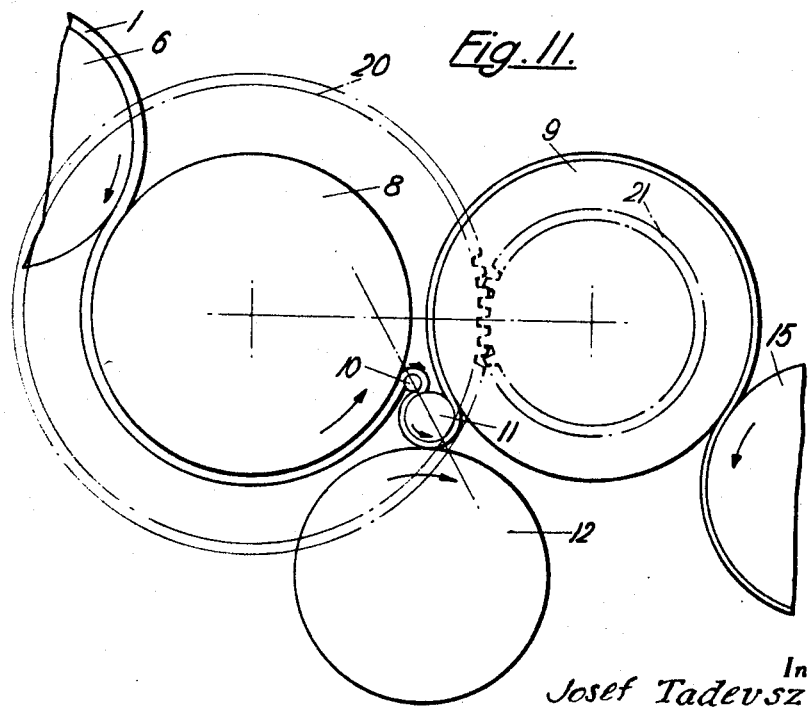
Inventors
Josef Tadeusz Franek
Brian Grinsted.
By
Mason, Porter, Diller & Brown
Attorneys July 30, 1968  J. T. FRANEK ET AL  3,394,574
TREATMENT OF STRIP METAL
Filed March 29, 1966  8 Sheets-Sheet 8

Inventors
Josef Tadeusz Franek
Brian Grinsted
By
Mason, Porter, Diller & Brown
Attorneys … # 3,394,574
TREATMENT OF STRIP METAL
Jozef Tadeusz Franek, London, and Brian Grinsted, Pinner, England, assignors to The Metal Box Company Limited, London, England, a British company
Filed Mar. 29, 1966, Ser. No. 538,346
Claims priority, application Great Britain, Apr. 2, 1965, 14,122/65
11 Claims. (Cl. 72—205)

This invention relates to the treatment of ferrous or non-ferrous metal strip, for example blackplate, tin-plate, or aluminium, which is normally cold-rolled to pre-determined thicknesses which may be of the order of 0.005 to 0.015 inch or less and in widths of 20 inches to 80 inches.

It is known in the rolling of thin gauge metals, particularly in wide strip form and in thicknesses below 0.015 inch, that the compressive forces required, combined with the elasticity of the roll material, result in roll flattening to an extent giving a minimum thickness that can be rolled by a given diameter of work roll.

It is also known that the compressive force required between the work roll of a rolling mill and the metal, to obtain a given rolling reduction in thickness, is less if work rolls of small diameter can be used. The work rolls in a simple orthodox four-high mill are normally backed up substantially in the plane of the rolling forces only, while the stability in the plane perpendicular to the rolling plane is achieved entirely by the stiffness of the working rolls themselves, hence their diameter has to be in the region of 20 inches or more, requiring high compression forces to obtain a reduction of high order. Rolling mills based on clusters of back-up rolls to support work rolls of small diameter against deflection in two planes have been made in a number of configurations to enable the benefits to be realised of small work rolls of an order of 1 inch diameter and less. The benefits resulting from a lower rolling load are many, including smaller diameter and hence lighter back-up rolls, lighter press frame, and roll bearings, and hence a tendency towards lower cost of plant. However, the need to utilize clusters of back-up rolls in itself adds complication and detracts from the simplicity of the conventional four-high rolling mill. The machining accuracy required is very high because the accumulation of errors in the individual dimensions of the many rolls can become appreciable at the gap between the opposing work rolls.

It has been proposed to reduce the thickness of strip metal by the use of work rollers which have diameters which are relatively large as compared with, or are greater than, that of the back-up rollers and which are supported for movement bodily relative to the back-up rollers so that the thickness of strip metal moved lengthwise under tension around and between the back-up and work rollers is reduced by rolling pressure produced by the lengthwise tension. With these proposals it has not yet been found possible to obtain the known benefits of work rollers the diameters of which are small as compared with that of the back-up rollers and the degree of reduction of thickness is only that which can be obtained by the passage of the strip through either one or two roll gaps.

It is an object of the present invention to provide a method of and apparatus for reducing the thickness of strip metal by rolling pressure produced by lengthwise tension in the strip metal, to obtain the benefits of work rollers of small diameter and effective parallelism of working contact surfaces without the complication associated with a cluster of back-up rollers, and to use back-up rollers the diameters of which are not subject to any geometrical limitation such as that associated with the configuration known as a cluster mill.

It is also an object of the invention to use work rollers of very small diameter, as will hereinafter appear, to prevent these work rollers from being bent by the pressures involved, and by the arrangement of the back-up rollers and work rollers to obtain greater accuracy of reduction than has hitherto been possible.

According to the invention there is provided the method of reducing the thickness of strip metal capable of plastic deformation which consists of defining an S-shaped path by locating first and second back-up rollers in spaced relation for rotation about fixed axes and positively rotating said rollers so that the second has a peripheral speed greater than that of the first, disposing between the back-up rollers first and second freely rotatable work rollers each of which has a diameter small as compared with that of the back-up rollers and which are movable bodily relative to the back-up rollers and co-operate one with the other and one with each of the back-up rollers, stabilizing the position of the work rollers relative to the back-up rollers by applying pressure to and lengthwise of one of the work rollers, moving a metal strip lengthwise under tension through said path, and at each of three positions spaced apart along the path applying to the strip a rolling load produced solely by the lengthwise tension in the strip.

Further according to the invention there is provided apparatus for reducing the thickness of strip metal capable of plastic deformation by moving the strip lengthwise under tension and applying thereto rolling loads produced by the lengthwise tension, said apparatus comprising positively rotated first and second back-up rollers supported in spaced relation for rotation about fixed axes, first and second work rollers disposed between the back-up rollers and each having a diameter small as compared with that of the back-up rollers, work roller support means operable to support the work rollers for free rotation about the axes thereof, for movement bodily relative to the back-up rollers, and for cooperation one with the other and one with each of the back-up rollers to form therewith an S-shaped path through which the strip metal is moved lengthwise under tension, and pressure applying means operable to apply pressure to and lengthwise of one of the work rollers to stabilize the position of the work rollers relative to the back-up rollers, the arrangement being such that at each of three positions spaced apart along the S-shaped path there is applied to the strip metal passing therethrough a rolling load produced solely by the lengthwise tension in the strip.

In order that the invention may be clearly understood embodiments thereof will now be described, by way of example, with reference to the accompanying drawings, in which:

FIG. 1 illustrates diagrammatically apparatus according to the invention,

FIG. 2 is a longitudinal section through a machine embodying apparatus according to the invention, some parts being omitted for clarity, FIG. 3 is a section, to an enlarged scale, of a part of the apparatus according to the invention, FIG. 4 illustrates means for supporting work rollers shown in FIG. 1, FIG. 5 is a section on line V—V, FIG. 4, FIG. 6 is a section on line VI—VI, FIG. 5, FIG. 7 is a section on line VII—VII, FIG. 6, FIG. 8 digrammatically illustrates the mode of operation of the apparatus according to the invention, and FIGS. 9 to 14 illustrate modifications to the apparatus.

In the drawings like references indicate like or similar parts.

Referring to the drawings, strip metal 1 is moved lengthwise from a decoiler, not shown, and passes round a guide roller 2 provided with flanges 4 to prevent lateral wandering of the strip. After passing round a guide roller 3 the strip is moved between an input bridle roller 5 and pinch rollers 6, 7 and a first back-up roller 8 which is spaced from a second back-up roller 9. As the strip is moved from roller 8 to roller 9 it is moved lengthwise in an S-shaped path defined by freely rotatable first and second work rollers 10, 11 which co-operate with each other and respectively with the back-up rollers 8, 9. Pressure applying means shown as a freely rotatable roller 12 co-operates with and is movable towards and away from roller 11. The roller 12 applies pressure to and lengthwise of the roller 11 to stabilize the position of the work rollers 10, 11 relative to the first and second back-up rollers 8, 9 during the reduction of the thickness of the strip as the strip passes through the S-shaped path. On leaving roller 9 the strip passes around and between an output bridle roller 13 and pinch rollers 14, 15, 16 to the cut-up line, not shown. With the exception of the rollers 10, 11 and 12 the rollers are positively driven by a train of gears 17 to 25, FIG. 1, the rolling reduction being established by the ratio of the gears 20, 21 driving the shafts 26, 27 of the back-up rollers 8, 9, the roller 9 being driven to have peripheral speed greater than that of roller 8. The other gears and roll diameters are related to the appropriate linear speed of the strip 1 before and after reduction. The gear train is driven from any suitable source, not shown. The pinch rollers 3, 6, 7, 14, 15, and 16 are, in known manner, resiliently mounted for adjustment towards and away from the rollers with which they co-operate in order to control the pressure exerted thereby.

As can be seen from the drawings, the diameter of the work rollers 10, 11 is small as compared with that of the first and second back-up rollers 8, 9. Diameter ratios are not critical but will preferably be of the order of 1:10 to 1:20.

In order for the apparatus to perform satisfactorily it is not necessary to provide the work rollers 10, 11 with bearings. However, for ease of threading the strip 1 through the S-shaped path these rollers are provided with bearings and are supported as will now be described. The first work roller 10 is mounted in thrust bearings 28 mounted in a housing 128, FIGS. 5 and 7, and the second work roller 11 is mounted in bearings 29 contained in housings 30 each of which has a gear wheel 31 secured thereto. The housings 128 are pivoted on a spindle 32, FIG. 6, carried by the housing 30 and the work rollers are retained in the working positions thereof by bolts 33 and springs 34 which surround the bolts and are interposed between the housings 128 and 30, FIG. 6. The gear wheels 31 are provided with bosses 35, FIGS. 5 and 7, which are located in clearance slots 36, FIG. 5, formed in brackets 37, FIGS. 4, 5 and 7, fixed to the machine frame 38, and arms 39 are pivoted on the bosses 35 and are connected by a tie rod 40, FIGS. 4 and 5, rotatable in the arms 39. The bosses 35 are eccentric to bearings 29 as can be seen in FIG. 5. Pinions 41, FIGS. 4 and 5, are secured to the tie rod 40 and mesh with idlers 42 rotatably mounted on the arms 39. The idlers 42 also mesh with the gear wheels 31. The idlers 42 are carried by spindles 43, FIG. 5, provided with square ends 44 arranged to receive a spanner or other tool by which the spindles 43 may be rotated.

The stabilizing roller 12 is carried on bearings 45, FIG. 3, which are supported by rods 46 connected to toggle linkages consisting of links 47, 48 of which one end of each of links 48 is pivoted to a slider 49 slidable between guides 50. The sliders 49 are connected to screws 51 secured into the machine frame 38 and each screw carries a worm-wheel 52 which meshes with a worm shaft 53 common to the worm-wheels 52.

Threading of the strip 1 through the machine is facilitated by guides 54, FIG. 2, and preparatory to the threading operation the stabilizing roller 12 is lowered to position 12a, FIG. 4, by rotation of the worm shaft 53 so that the work roller 10 can be moved to the position 10a, FIG. 4, at which position of the roller 10 it is easier to thread the strip along its path between the rollers 8, 10, 11 and 9. Movement of the work roller 10 to position 10a is effected by rotation of one of the spindles 43 so as to rotate the idler 42 associated therewith and, through pinion 41 and tie rod 40, the idler on the other of the spindles 43. Rotation of the idlers 42, counter-clockwise as viewed in FIG. 4, causes the gear wheel 31 to turn on the bosses 35 until the work rollers reach the positions 10a, 11a shown in FIG. 4. When the strip has been threaded around the rollers the spindle 43 is again rotated, this time clockwise as viewed in FIG. 4, to return the gear wheel 31 to the full line positions thereof shown in FIG. 2, thus raising the work rollers 10, 11 to the approximate working positions thereof. The stabilizing roller 12 is also restored to the working position thereof by rotation of the worm shaft 53 to effect raising of the stabilizing roller.

During rolling the strip is lubricated in any suitable manner, as by jets 60, FIG. 2, of lubricant, and the work rollers 10, 11 are, due to the provision of the slots 36, FIG. 5, free to float relative to the back-up rollers 8, 9 and tension in the strip at the three positions 55, 56, 57 of rolling, which are spaced apart along the S-shaped path, is the resultant of the forces around the work rollers 10, 11 and the rolling load at the positions 55, 56, 57, FIG. 8, is the resultant of the forces around rollers 10, 11 as indicated at 58, 59, FIG. 8, and is produced by the lengthwise tension in the strip which is induced by increasing the velocity of the strip issuing from the S-shaped path and depends on grip being maintained between the strip and the back-up rollers 8, 9 by means of the pressure rollers 6, 7 and 14, 15. As the tension in the strip rises the strip pulls the work rollers 10, 11 into forceful contact with the strip at the positions 55, 56, 57, FIG. 8 of rolling.

From the foregoing it will be understood that the work rollers 10, 11 are supported by the back-up rollers 8, 9 and the stabilizing roller 12 and by the strip 1 itself. The strip by wrapping around the work rollers 10, 11 creates an important backing-up force due to its tension thus the tensile backing-up force is in equilibrium with the rolling forces which are created solely by the lengthwise tension in the strip. The stabilizing roller 12 has to provide a substantially large reaction while stabilizing the position of the work rollers 10, 11, and the work rollers, being supported in three planes, as can be seen from FIG. 4 are in completely stable equilibrium. The diameter of the stabilizing roller 12 is smaller than that of the first and second back-up rollers 8, 9 and is proportional to the load taken. Most of the reduction in the thickness of the strip is effected between the first and second back-up rollers 8, 9 and the work rollers 10, 11 but because, as shown in the drawings, the strip 1 is threaded to pass between the work roller 11 and the stabilizing roller 12 a negligible reduction in strip thickness will take place between the stabilizing roller 12 and the work roller 11 and the apparatus is the equivalent of a single four stand mill. The position of the stabilizing roller 12 relative to that of the first and second back-up rollers 8, 9 determines the ratio of the rolling load to the strip tension; the greater the distance, the higher the rolling load and the lower the strip tension.

In one embodiment of the invention the diameter of the first and second back-up rollers 8, 9 and of the bridle rollers 5, 13 is 20 inches, that of the work rollers 10 is 1 inch, that of the work roller 11 is 3 inches and that of the stabilizing roller 12 and of the rollers 3, 6, 7, 14, 15, and 16 is 16 inches.

From the foregoing description it will be understood that the apparatus according to the invention provides three roll bites 55, 56, 57, spaced apart along the S-shaped path of the strip metal and is, in effect, a three stand mill operating in a single four roller stand, thus in an economical space providing a result hitherto obtainable only by the known forms of three stand mills which embody three sets of rollers spaced apart along the path of the strip metal. Further, the rolling load at each bite 55, 56, 57 is approximately equal but the effect of the large diameter of the back-up rollers 8, 9 is to reduce the compressive stresses in the first and third bites 55, 57 to approximately 70% of the value of that in the central bite 56. Tests have indicated that this stress in conjunction with the tension is sufficient to achieve about one quarter of the total reduction of thickness in each of the first and third bites 55, 57 and about one-half in the bite 56. This results in lessening the rolling load to about 60% of the value which would be required if the whole of the reduction were achieved in the bite 56.

Tests have shown that by the use of the method and apparatus according to the invention there may be obtained thickness reductions of at least 34%. For example, strip metal having a thickness of 0.0125 inch can be reduced to a thicknes of 0.0082 inch. It is also to be understood that this reduction is achieved during a single pass of the strip through a mill of greatly simplified structure as compared with known forms of mill, the apparatus according to the invention consisting of a single four stand mill instead of the usual plurality of four high mills which are spaced apart along the path of the strip, thus reducing the cost of initial installation and the cost of maintenance. The cost of maintenance is further reduced by the horizontal inline arrangement of the rollers as shown in FIG. 2 because by this arrangement it is possible easily to remove and to replace any of the rollers for the purposes of servicing.

The modified forms of the apparatus as illustrated in FIGS. 9 to 14 differ from that of FIGS. 1 to 8 only in that in FIG. 9 the work rollers 10, 11 are of equal diameter, in FIG. 10 the position of the work rollers relative to the back-up rollers differs from that of FIGS. 1 to 8, and the work roller 10 is of greater diameter than that of the work roller 11. In FIG. 11 the diameter of the work roller 10 is less than that of the work roller 11.

Figure 13:
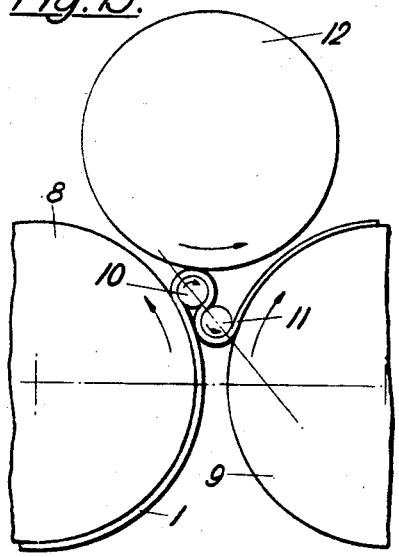
Figure 14:
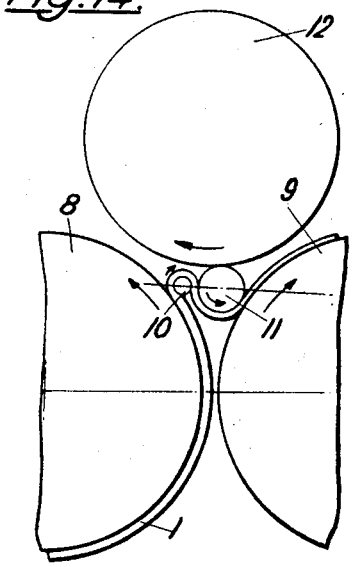

The modified forms of the apparatus as illustrated in FIGS. 12 to 14 differs from that of FIGS. 1 to 8 in that the stabilizing roller 12 is disposed above the plane containing the axes of the first and second back-up rollers. Further, in FIG. 12 the diameter of the work roller 10 is greater than that of work roller 11, and in FIG. 13 the diameters of the work rollers 10, 11 are equal. It will be understood that in the embodiments illustrated in FIGS. 12 to 14 the stabilizing roller 12 will be raised out of the working position thereof and the work roller 10 will be moved clockwise from its working position during threading of the strip 1.

We claim:

1. A method of reducing the thickness of strip metal capable of plastic deformation which consists of defining an S-shaped path by locating first and second back-up rollers in spaced relation for rotation about fixed axes and positively rotating said rollers so that the second has a peripheral speed greater than that of the first, disposing between the back-up rollers first and second freely rotatable work rollers each of which has a diameter small as compared with that of the back-up rollers and which are movable bodily relative to the back-up rollers and cooperate one with the other and one with each of the back-up rollers, stabilizing the position of the work rollers relative to the back-up rollers by applying pressure to and lengthwise of one of the work rollers, moving a metal strip lengthwise under tension through said path, and at each of three positions spaced apart along the path applying to the strip a rolling load produced solely by the lengthwise tension in the strip.

2. The method according to claim 1, in which approximately one-half of the reduction is effected at the second of said three positions, that is between the work rollers, and approximately one quarter of the reduction is effected at each of the first and third of said three positions, that is between the first back-up roller and the first work roller and between the second work roller and the second back-up roller.

3. Apparatus for reducing the thickness of strip metal capable of plastic deformation by moving the strip lengthwise under tension and applying thereto rolling loads produced by the lengthwise tension in the strip, said apparatus comprising positively rotated first and second back-up rollers supported in spaced relation for rotation about fixed axes, first and second work rollers disposed between the back-up rollers and each having a diameter small as compared with that of the back-up rollers, work roller support means operable to support the work rollers for free rotation about the axes thereof, for movement bodily relative to the back-up rollers, and for co-operation one with the other and one with each of the back-up rollers to form therewith an S-shaped path through which the strip metal is moved lengthwise under tension, and pressure applying means operable to apply pressure to and lengthwise of one of the work rollers to stabilize the position of the work rollers relative to the back-up rollers, the arrangement being such that at each of three positions spaced apart along the S-shaped path there is applied to the strip metal passing therethrough a rolling load produced solely by the lengthwise tension in the strip.

4. Apparatus according to claim 3, wherein the pressure applying means comprise a rotatable stabilizing roller having a diameter greater than that of the work rollers.

5. Apparatus according to claim 4, wherein the stabilizing roller is mounted for movement towards and away from the work roller engageable thereby.

6. Apparatus according to claim 5, wherein the stabilizing roller is mounted in bearings supported by toggle linkage operation of which is effected by screws rotatable by worm-wheels which are rotatable by a worm shaft common thereto.

7. Appartus according to claim 3, wherein the work roller support means comprises bearings for the first work roller mounted in a housing and bearings for the second work roller mounted in a housing, said housings being pivotally connected and retained in the working positions of the work rollers by bolts and springs surrounding the bolts and interposed between the housings.

8. Apparatus according to claim 7, wherein the housings at the opposite ends of the work rollers are mounted on arms pivoted on gear wheel bosses, said bosses being located in clearance slots formed in fixed brackets thereby to permit the work rollers to float relative to the back-up rollers.

9. Apparatus according to claim 8, wherein the axis of the second work roller is eccentric to that of said gear wheels and said arms are connected at positions thereof remote from said bosses by a tie rod, and wherein a pinion and an idler gear are rotatably mounted on each arm, each idler gear meshing with its associated pinion and with a gear wheel about the boss of which its arm is pivoted and being rotatable to move the work rollers between the working position thereof relative to the back-up rollers and a position spaced therefrom and at which threading of strip metal between the work rollers can be effected.

10. Apparatus according to claim 3, wherein one of the work rollers has a diameter greater than that of the other work roller.

11. Apparatus according to claim 3, wherein the lengthwise tension is applied to the strip by co-operating input and output bridle and pinch rollers operable to grip the strip and respectively to feed the strip towards the first back-up roller and to draw the strip away from the second back-up roller.

(References on following page)

References Cited

UNITED STATES PATENTS

| | | | |
|---|---|---|---|
| 2,226,948 | 12/1940 | Simons | 72—205 |
| 2,291,361 | 7/1942 | Walsh | 72—205 |
| 2,303,143 | 11/1942 | Spangler | 72—205 |
| 2,332,796 | 10/1943 | Hume | 72—205 |
| 2,392,323 | 1/1946 | Koss | 72—164 |
| 2,526,296 | 10/1950 | Stone | 72—205 |
| 3,098,403 | 7/1963 | Metzer | 72—242 |
| 3,253,445 | 5/1966 | Franek | 72—164 |

FOREIGN PATENTS 969,395 9/1964 Great Britain.

CHARLES W. LANHAM, *Primary Examiner.*

A. RUDERMAN, *Assistant Examiner.*